E. A. MORGAN.
CORN DRIER.
APPLICATION FILED OCT. 26, 1920.

1,404,632.

Patented Jan. 24, 1922.
3 SHEETS—SHEET 1.

Elizabeth A. Morgan.
INVENTOR

BY Victor J. Evans
ATTORNEY

WITNESS:
George L. [signature]

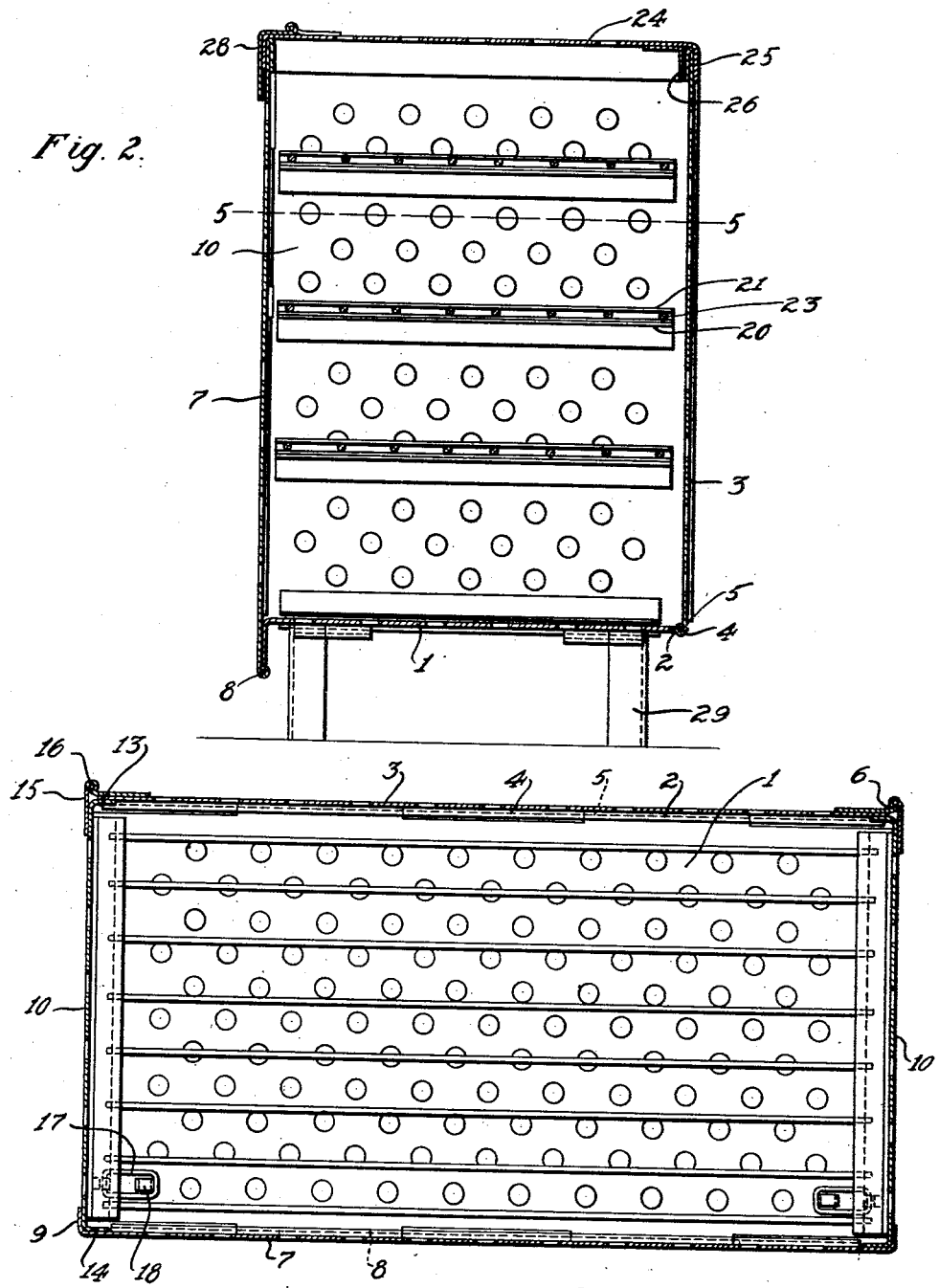

E. A. MORGAN.
CORN DRIER.
APPLICATION FILED OCT. 26, 1920.

1,404,632.

Patented Jan. 24, 1922.
3 SHEETS—SHEET 3.

Elizabeth A. Morgan, INVENTOR

BY Victor J. Evans
ATTORNEY

WITNESS:

UNITED STATES PATENT OFFICE.

ELIZABETH A. MORGAN, OF HAMPSHIRE, ILLINOIS.

CORN DRIER.

1,404,632.  Specification of Letters Patent.  Patented Jan. 24, 1922.

Application filed October 26, 1920. Serial No. 419,601.

*To all whom it may concern:*

Be it known that I, ELIZABETH A. MORGAN, a citizen of the United States, residing at Hampshire, in the county of Kane and State of Illinois, have invented new and useful Improvements in Corn Driers, of which the following is a specification.

My present invention has reference to a storage device for seed corn.

My object is to produce an apertured or reticulated casing of a novel construction, in which the seed corn is arranged, the said casing permitting the free circulation of air to the corn therein, elevating the corn above the floor on which the device is arranged, and protecting the same from rodents.

A further object is the production of a seed corn drying device which shall be of a comparatively small construction, but which will support therein a comparatively large number of seed corns, and which, when not in use can be collapsed and folded into a small package for storage or shipment.

The foregoing, and other objects which will appear as the nature of the invention is better understood, may be accomplished by a construction, combination and operative arrangement of parts, such as is disclosed in the drawings which accompany and which form part of this application.

In the drawings:—

Figure 2 is a transverse sectional view through the cabinet in its set up condition.

Figure 5 is a horizontal sectional view approximately on the line 5—5 of Figure 2.

Figure 1:
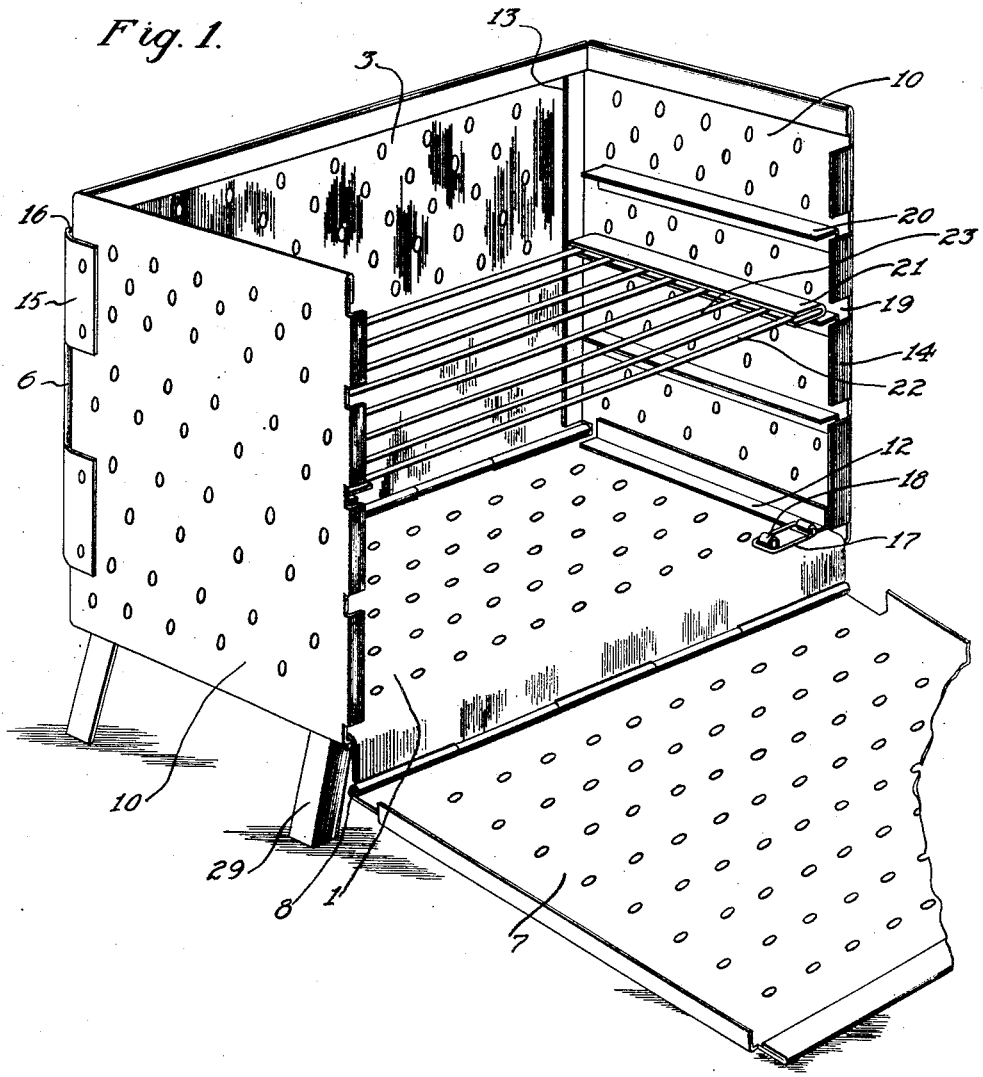
Figure 1 is a perspective view of the casing or cabinet, with the front thereof let down and the top removed.
Figure 6:
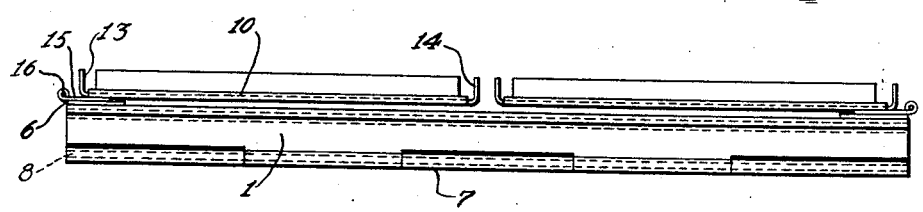
Figure 6 is a view of the device collapsed.
Figure 3:
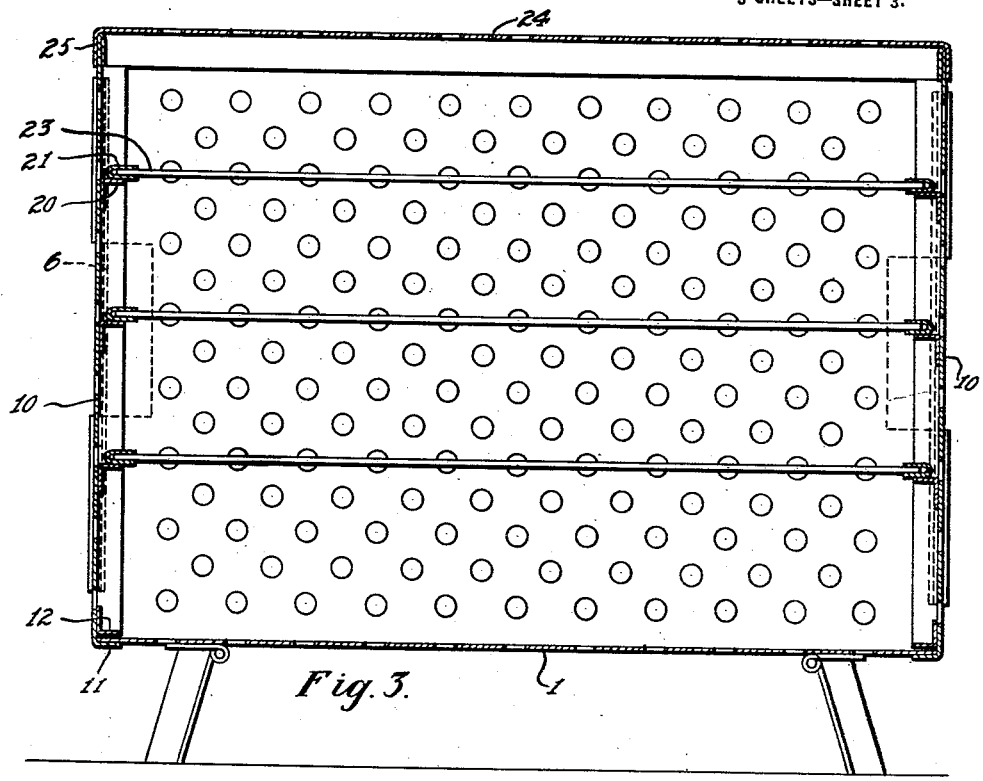
Figure 3 is a vertical longitudinal sectional view through the same.
Figure 4:
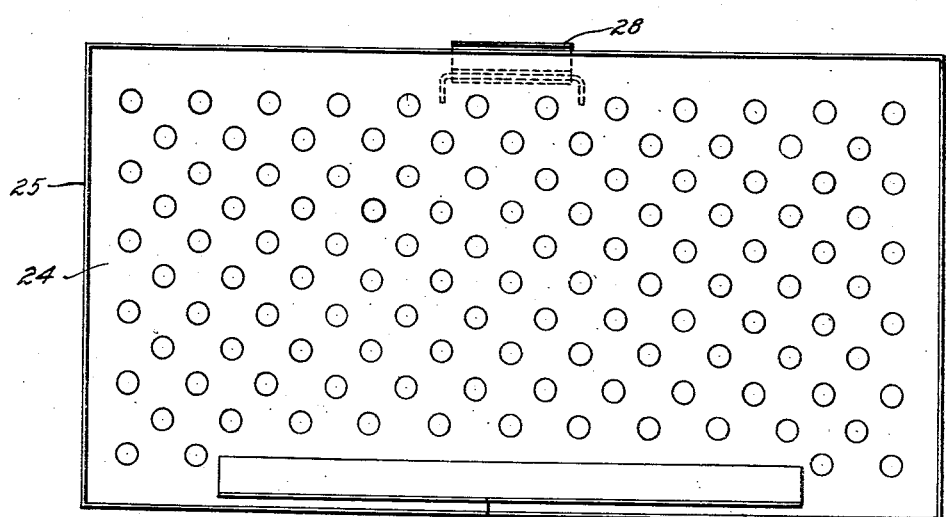
Figure 4 is an inverted plan view of the cover.

All of the plates employed in making up a seed corn drying cabinet, in accordance with this invention are apertured but the apertures are not of sufficient size to permit of the entrance of rodents into the cabinet.

The bottom plate is indicated by the numeral 1 and has its edges formed with spaced extensions which are rounded upon themselves to provide barrels 2. The back plate, indicated by the numeral 3 has its lower edge formed with extensions rolled to provide barrels 4 that are arranged between the barrels 2, and received through the barrels 2 and 4 is a pivot pin 5. In this manner, the back is hingedly connected to the bottom. The upper edge of the back is bent over itself to reinforce the same, and the rear face of the back adjacent to the edges thereof has centrally secured thereto plates that have their outer ends rounded upon themselves to form barrels or knuckles 6.

The front plate is indicated by the numeral 7, and has its lower edge formed with spaced extensions which are rounded upon themselves to provide barrels that are arranged between the barrels 3 on the outer edge of the bottom 1, and through the bores of the aligning barrels there is passed a pivot rod 8 which hingedly connects the front to the bottom. The upper edge of the front plate is bent over itself to reinforce the same, and the said front has its edges provided with inwardly directed right angularly spaced flanges 9.

The end plates are of a similar construction, and are each designated by the numeral 10. Each of the end plates has its lower end flanged inwardly as at 11 and is provided with an additional flange 12 which is in parallelism with the flange 11, and these flanges are designed to receive therebetween the ends of the bottom plate 1. The flanges do not extend the entire width of the end plates 10. The upper edge of each of the ends 10 is bent over itself to reinforce the same, and the edges of the said plates are flanged inwardly as at 13 and 14 respectively. A pair of plates 15 are secured to the end plates 10 and are provided with knuckles which receive therebetween the knuckles 6 on the back plate, and passing through the bores of these knuckles are securing rods 16. The upper flanges 12 of the end plates, adjacent to the outer edge of the said plates have loosely connected therewith substantially U-shaped bales 17 that are received in eyes 18 on the upper face of the bottom plate 1. In this manner, the ends are hingedly connected to the bottom plate, but the hinges are such as to permit of the same being folded over the back plate, when the latter is folded over the bottom, and when the device is in its collapsed condition. In such condition, the front plate is folded under the bottom, as clearly illustrated by the drawings.

The front flanges 14 of the end members 10 are notched at suitable intervals, as indicated by the numeral 19, and in a line with the lower edges of the said notches the end plates have inwardly directed flanges 20. On these flanges rest the end members 21 of frames 22 that support the seed corn. The end members are connected by spaced rods 23, and between these rods the ears of seed corn are arranged. The corn is positioned horizontally in the cabinet, so that a comparatively large number of ears can be thus accommodated. When the device is in its set up position, the front is swung over the ends, the spaced flanges on the edges of the front contacting with the outer faces of the end plates, and the outer flanges on the ends contacting with the inner face of the front plate.

The top plate of the device is indicated by the numeral 24 and is provided with a continuous downturned flange 25. These flanges are designed to contact with the upper ends of the sides, the front and rear plates, and to hold the said body plates against inwardly movement an additional flange 26 may be employed, sufficiently spaced from the outer flanges 25 to receive therebetween the top edges of the body plates. The top plate has a hinged spring clip 28 at the center thereof. This clip is designed to frictionally engage with the bead or ledge provided by the reinforcement at the upper edge of the front plate 7, and thus aid in holding the device in its set up condition. The flanged top is arranged over the lapping end plates when the device is collapsed, and the frames which support the seed corn are arranged between the flanges of the said top when the device is in such collapsed condition.

The base or bottom 1, at the corners thereof may be, and preferably is provided with depending leg portions 29 which are preferably hinged thereto so as to be folded thereunder when the device is collapsed, and to elevate the structure when the cabinet is in its set up condition.

From the foregoing description, when taken in connection with the drawings, it will be seen that the cabinet is elevated from the floor or other support from which it is arranged so that a free circulation of air can be directed therethrough. All of the plates constituting the body of the construction being perforated in no ways impede the air circulation. Any desired number of frames or trays 21 may be employed so that a comparatively large amount of seed corn may be arranged in the cabinet for drying. The device when not in use is folded into a small package which may be conveniently stored or shipped, and it is thought that the foregoing description, when taken in connection with the drawings will fully set forth the construction and advantages of the improvement to those skilled in the art to which such inventions relate so that a further description will not be necessary.

Having thus described the invention, what I claim, is:—

A device of the class described comprising a reticulated bottom plate, a plurality of legs hingedly connected to said plate, a reticulated rear plate pivotally secured to one side of the bottom plate and having the upper edge thereof bent upon itself, a reticulated front plate pivotally secured to the opposite side of said bottom plate and having the upper edge thereof bent upon itself, a pair of parallel flanges extending inwardly from the opposite ends of the front plate, a pair of parallel reticulated end plates having the upper edges thereof bent upon itself, spaced parallel flanges extending inwardly from said end plates at the lower end thereof and engaging opposite ends of said bottom plate, a flange extending inwardly from one side of each end plate and engaging said rear plate, a plurality of plates secured to said end plates and provided with knuckles, a plurality of plates secured to said rear plate and provided with knuckles disposed between the knuckles aforesaid, rods extending through said knuckles, a plurality of spaced flanges extending inwardly from said end plates, a plurality of frames adapted to engage the last mentioned flanges, a flange extending inwardly from the opposite side of each end plate and provided with a plurality of spaced notches arranged parallel to the last mentioned flanges, means for removably securing said end plates to said bottom plates, a reticulated top plate adapted to engage the upper edges of the reticulated plates aforesaid, and a plurality of spaced parallel flanges extending downwardly from said top plate adapted to engage the reticulated plates aforesaid.

In testimony whereof I affix my signature.

ELIZABETH A. MORGAN.